No. 641,172. Patented Jan. 9, 1900.
P. C. WARING.
AUTOMATIC FEEDING AND WEIGHING MECHANISM.
(Application filed June 14, 1899.)
(No Model.) 2 Sheets—Sheet 1.
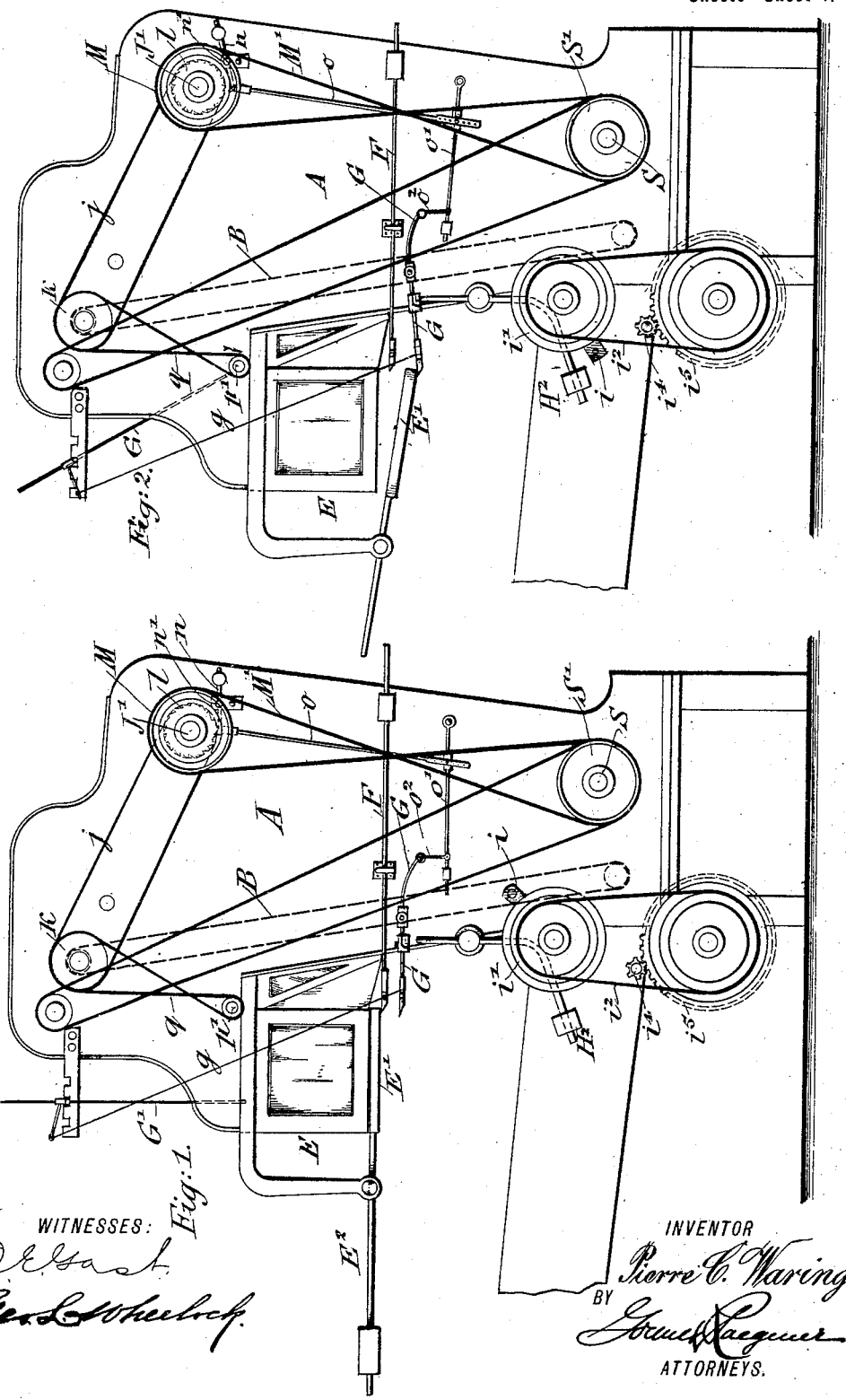

No. 641,172. Patented Jan. 9, 1900.
P. C. WARING.
AUTOMATIC FEEDING AND WEIGHING MECHANISM.
(Application filed June 14, 1899.)
(No Model.) 2 Sheets—Sheet 2.
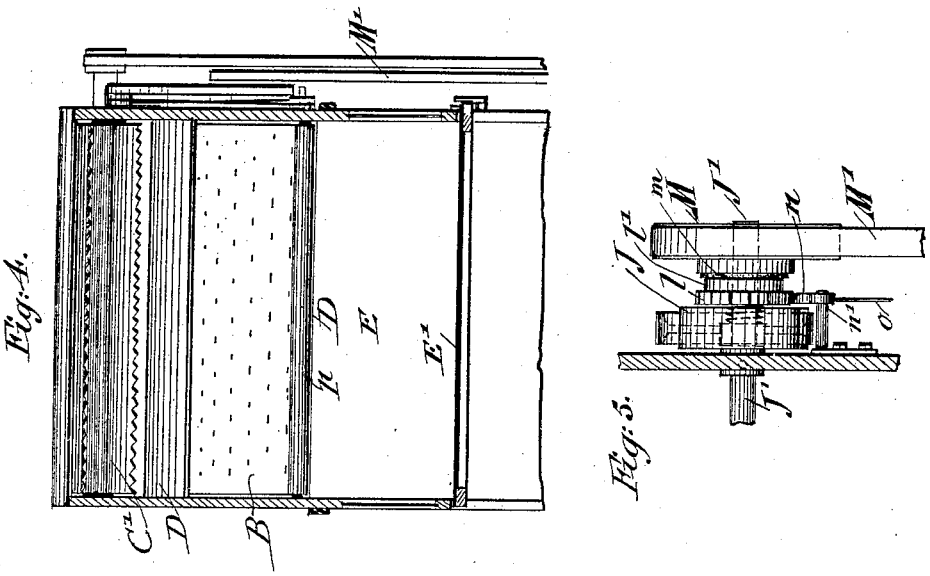
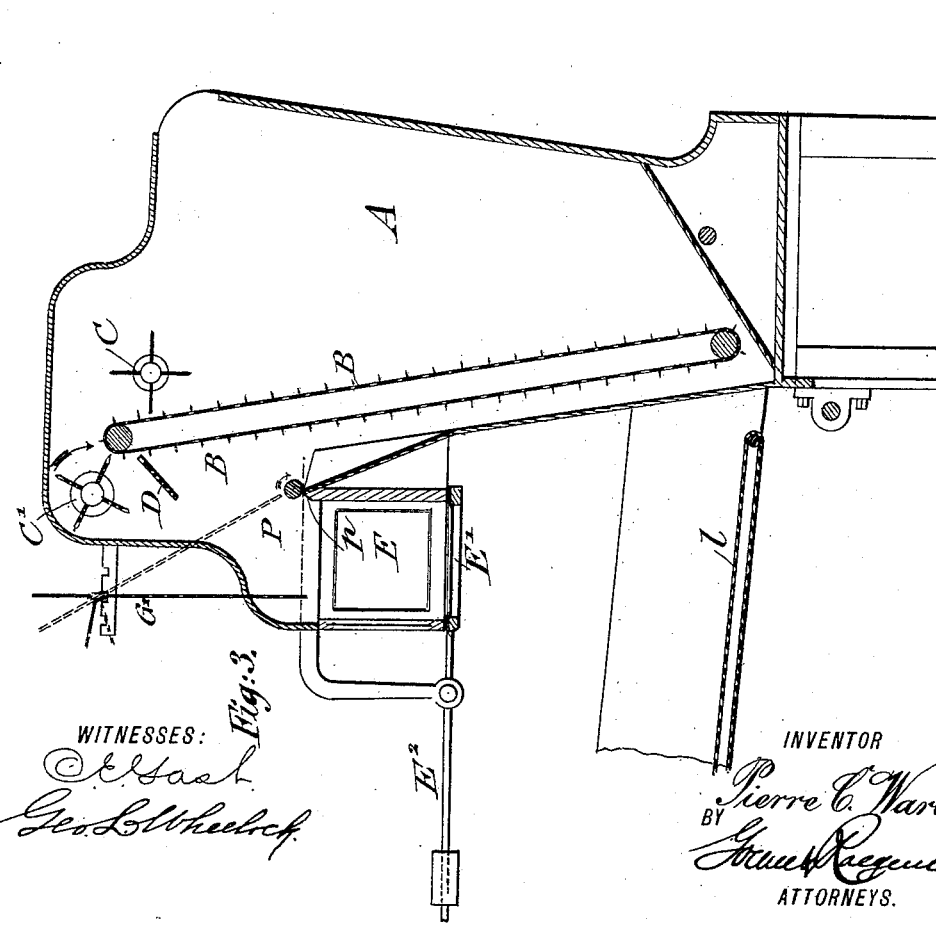
WITNESSES:
INVENTOR
Pierre C. Waring
BY
ATTORNEYS.

UNITED STATES PATENT OFFICE.

PIERRE C. WARING, OF YONKERS, NEW YORK.

AUTOMATIC FEEDING AND WEIGHING MECHANISM.

SPECIFICATION forming part of Letters Patent No. 641,172, dated January 9, 1900.

Application filed June 14, 1899. Serial No. 720,460. (No model.)

*To all whom it may concern:*

Be it known that I, PIERRE C. WARING, a citizen of the United States, residing at Yonkers, in the county of Westchester and State of New York, have invented certain new and useful Improvements in Automatic Feeding and Weighing Mechanism for Hat-Body-Forming or other Machines, of which the following is a specification.

This invention relates to certain improvements upon the automatic feeding and weighing mechanism for hat-body-forming or other machines disclosed by my Patent No. 628,879, dated July 11, 1899, in which determined quantities of fibrous material are automatically weighed out and delivered intermittently to the hat-body-forming or other machine at the end of such predetermined periods of time as may be necessary for the proper working of the hat-body-forming or other machine. In my said patent there is used in connection with the weighing mechanism a controlling-lever, which, as soon as the fully-determined quantity of fibrous material has been weighed out for the hat-body-forming or other machine is actuated instantaneously by the scale-pan or tilting platform, so as to operate a part of the mechanism which deflects the supply-stream of fibrous material from the weighing device to the main hopper. The constant working and rolling about which the fibrous material receives in the main hopper of my said patented machine while not injurious to the lower qualities of fur might affect the finer qualities of fur or other fibrous material; and the main object of the present invention is to reduce to a minimum the rolling about and working of the fibrous material in the main hopper while the mechanism is performing its function in connection with the hat-body-forming or other machine. To reduce this working and rolling about of the fibrous material in the main hopper to a minimum, I utilize in my present invention the referred to controlling-lever in such a way as to stop the feed-apron at about the same moment that the deflector returns the supply-stream to the main hopper and to maintain the apron inoperative during the time between the completed weighing of the determined quantity of material and the unexpired time of the predetermined interval when it is to be delivered to the hat-body-forming or other machine, thus avoiding the unnecessary working and rolling about of the material in the main hopper.

In those automatic weighing-machines which are so constructed that the scale-beam, which alone regulates the quantity to be weighed, is called upon to exert a force to operate a clutch or any other mechanism during the time the material is being weighed, or, furthermore, if said scale-beam comes in any contact by friction or otherwise with any other part of the machine during the time the material is being weighed, the sensitiveness of the scale-beam is interfered with and results in the weighing being only approximately correct or uniform; but by utilizing my said controlling-lever to operate the clutch mechanism the accuracy of the weighing mechanism is not affected, owing to the absolute independency of the controlling-lever from the scale-beam, this scale-beam regulating the determined quantity of material, performing but that one function, and being at all times free from any foreign influence or from any contact with the controlling-lever, the force necessary to operate said lever being derived from the weighing-platform or scale-pan instantaneously, but not until the weighing-platform has received the determined quantity of fibrous material in its entirety.

The further object of the invention is to prevent the liability of the weighing mechanism to deliver more than the predetermined weight. This is accomplished by providing a guard or clearer, kept in motion by suitable means, which prevents thereby the accumulation of fibrous material on the top ledge of the receiving-box, over which the deflector throws the fibrous material back into the main hopper, or such a moving guard or clearer may be used to prevent the accumulation of fibrous material at any other point above the scale-pan or tilting platform where in case of accumulation it is liable to be dropped thereon.

The invention consists of certain features of construction and combinations of parts to be hereinafter described and claimed.

In the accompanying drawings, Figure 1 is a side elevation of as much of the feeding and weighing mechanism of a hat-body-forming machine as are necessary to show my improvements. Fig. 2 is a similar side elevation showing the parts in another position. Fig. 3 is a vertical central section. Fig. 4 is a sectional front elevation of the upper parts of the feed mechanism, and Fig. 5 is a detail of the clutch.

Similar letters of reference indicate corresponding parts.

Referring to the drawings, A indicates the main hopper, B the toothed endless belt or apron therein, and S the main driving-shaft for operating the mechanism. C is the clearing-roller, C' the wiper, and D an inclined plate by which the fur or other fibrous material is conducted to the box E of the weighing mechanism. E' is the oscillating platform or scale-pan, from which extends the weighted lever $E^2$ and which is held closed against the open bottom of box E by the scale-beam F, that is adjusted to the determined quantity of fibrous material to be weighed out. G is a counterbalanced lever or what may be termed a "controlling-lever," as it is connected with a pivoted deflector G', suspended from a notched bar $G^2$ by connecting-cord $g$ for the purpose of deflecting the supply-stream from the weighing device to the main hopper A immediately upon the completed weighing of the determined quantity and for maintaining such deflection until the expiration of the predetermined interval, such interval being under the control of the mechanism consisting of lever $H^2$, pulley $i'$, gear-wheel $i^3$, belt $i^2$, pinion $i^4$, mounted on the shaft of conveyer $h$, and pin $i$, which actuates lever $H^2$, so as to release the same from the controlling-lever G. All these parts are described at length in my heretofore-mentioned patent, and the above brief description will suffice to gain a clear idea of the present improvements; but it must be reiterated that the weighing mechanism is independent of any influence of the controlling-lever G, as this is operated instantaneously by the scale-pan after the scale-beam has performed its function, and the lever G only retains the scale-pan in position until the expiration of the predetermined interval, when the scale-pan is released and the weighed-out fibrous material deposited onto the conveyer $h$.

In my patented machine the apron B moves continuously and unnecessarily works up and rolls the fibrous material during the time that the deflector is returning the same to the feed-hopper, which unnecessary rolling and working is liable to prove deleterious to some of the finer qualities of fur or other fibrous material. In order to reduce this tendency to a minimum without affecting the accuracy of the weighing mechanism, a clutch controlled from lever G and adapted to intermittently stop the feed-apron B is employed.

J is a loose pulley on a shaft J' and over which is trained a belt $j$, that is also trained over a pulley $k$ on the upper shaft of the feed-apron B. Arranged on the hub of the pulley J is a ratchet-wheel $l$ and a friction-disk $l'$, which latter is adapted to frictionally bear upon another friction-disk $m$, that is arranged on the pulley M, fixed on the shaft J'. A power-transmitting belt M' is trained over pulley M and over a pulley S' on the power-shaft S. It is evident that when the pulley J is free to turn it will be turned by the described friction-clutch, so that the feed-apron B will travel and feed the fur over into the box E.

$n$ is a weighted dog pivoted to the feed-hopper at $n'$ and is adapted at the proper moment to take against the teeth of ratchet-wheel $l$ and to stop the same and the feed-apron. This clutch mechanism is in itself well known, but may of course be varied without departing from the spirit and scope of the invention, and I do not therefore make any claim to it as such. The dog $n$ is pivoted to a rod $o$, in turn pivoted at $o^3$ to a lever $o'$, pivoted at $o^4$ to the feed-hopper and connected by a pivot-link $o^2$ with the rear end of the controlling-lever G. The moment almost that the deflector G' is shifted by the lever G the motion of the feed-apron B is stopped by the throwing of the dog $n$ into engagement with ratchet-wheel $l$, so that in addition to the cutting off of the supply of fibrous material by the deflector the apron is instantly stopped and is prevented from unnecessarily working up and rolling the fibrous material in the feed-hopper. The apron is thereby stopped intermittently by the controlling-lever G without affecting the required weight of the material.

P is a clearer, here in the form of a roller, which is journaled in the side walls of the feed-hopper just above the ledge $p$, formed by the upper edge of box E, and is turned in the direction of the arrow, Fig. 3, by means of a belt $q$, which passes from pulley $k$ at the end of the upper shaft of the feed-apron over a pulley $p'$ on the end of the shaft of said roller.

The object of the clearer P is to prevent the accumulation of fibrous material on the ledge $p$, which would otherwise be dropped thereon from the deflector G' as it moves across it to return the surplus supply-stream to the feed-hopper. Without this clearer the fibrous material accumulates on said ledge and when heavy enough is apt to drop into the box E after the fibrous material has been weighed out, thus adding to the weight of the hat-body and causing it to be over weight.

Having thus described my invention, I claim as new and desire to secure by Letters Patent—

1. In automatic feeding and weighing mechanism, the combination, with the feeding means; of weighing mechanism, into the scale-pan of which the fibrous material is delivered from the feeding means, a clutch mechanism connected with the feeding means, and a controlling-lever entirely independent of any influence of the weighing mechanism during the weighing out of the material, and being connected with the clutch mechanism for operating it, said controlling-lever being acted upon by and responding and being sensitive to the action of the scale-pan, during the motion of the same after the determined quantity of material has been fully weighed out, substantially as set forth.

2. In an automatic feeding and weighing mechanism, the combination, with the feeding means, and weighing mechanism below the latter; of a movable deflector for returning the supply-stream of fibrous material back to the feeding means, and a clearer arranged below the delivery end of the feeding means and above the weighing mechanism, out of the path of the supply-stream of fibrous material as it is being delivered to the weighing mechanism, and means for moving said clearer for removing any stray material deposited on it by the said movable deflector and which would otherwise be liable to be added to or increase the predetermined weight of the material which has already been weighed out, substantially as set forth.

3. In automatic feeding and weighing mechanism, the combination, with the weighing mechanism, and a receiving-box above it; of a clearer-roll journaled close to a ledge at the upper part of said box, and means for turning said roll so as to prevent the accumulation of fibrous material on said ledge, substantially as set forth.

4. In automatic feeding and weighing mechanism, the combination, with the weighing mechanism, a receiving-box above the same, and a movable deflector for returning the supply-stream of fibrous material over a ledge at the upper part of said box, back into the feed-hopper; of a clearer-roll journaled close to said ledge, and means for turning said roll so as to prevent the accumulation of fibrous material on said ledge, substantially as set forth.

In testimony that I claim the foregoing as my invention I have signed my name in presence of two subscribing witnesses.

PIERRE C. WARING.

Witnesses:
    PAUL GOEPEL,
    GEO. L. WHEELOCK.